United States Patent Office 2,952,865
Patented Sept. 20, 1960

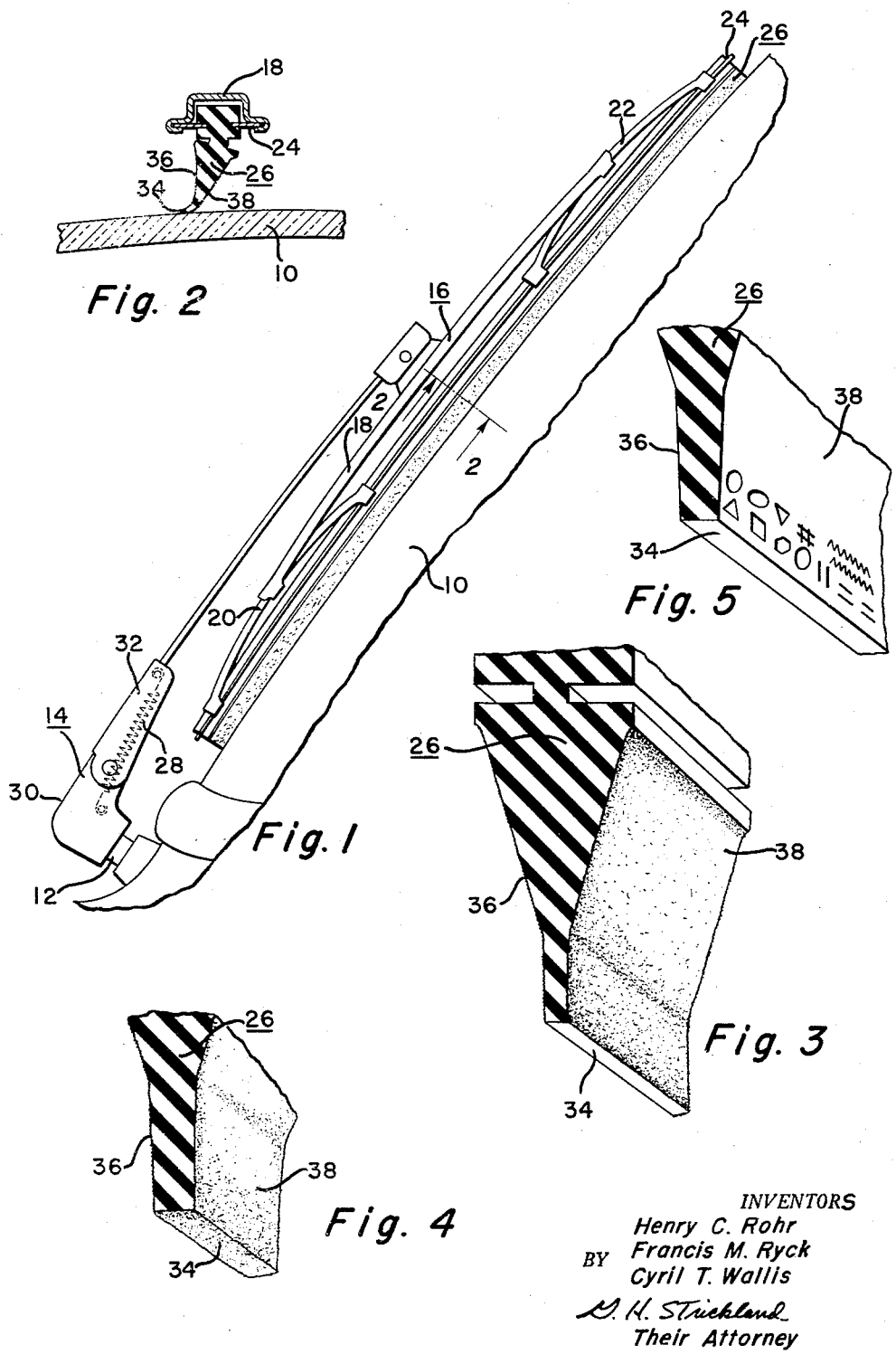

2,952,865
SQUEEGEE

Henry C. Rohr and Francis M. Ryck, Rochester, and Cyril T. Wallis, Brockport, N.Y., assignors to General Motors Corporation, Detroit, Mich., a corporation of Delaware Filed Dec. 19, 1955, Ser. No. 554,081

8 Claims. (Cl. 15—250.36)

This invention relates to squeegees, and particularly to squeegee wipers composed of rubber or rubberlike material designed for cleaning automobile windshields.

It has long been recognized that the coefficient of friction between a rubber or rubberlike squeegee, or wiper blade, and a glass surface, such as an automobile windshield, varies considerably, depending upon the condition of the windshield surface. In particular, it has been noted that the friction between a wiping element and a wet glass surface is usually low, while the friction between the wiping element and a dry, or nearly dry glass surface, sometimes known as a "tacky" condition, is very high.

On a wet glass surface a rubber or rubberlike wiper will move over the glass with very little friction, and wide variations in the degree of flexibility and the hardness of the wiper do not appear to greatly affect the friction. If, however, the glass is dry, or nearly dry, then the friction is greatly affected by the composition of the wiper, its flexibility and its surface treatment. In the windshield wiper art it has long been the practice to harden the surface of rubber wiper blades after molding, the purpose being to form a hard shell on the surface. Ordinarily molded rubber compounds of a degree of flexibility suitable for windshield wipers have a very high frictional drag on glass unless they are given a hardening treatment. Several methods of hardening are available and by way of illustration one method most generally used is to either immerse the molded rubber wiper in a liquid in which free chlorine is present for a measured time or to subject the wiper to free chlorine gas for a measured time. This process is generally known in the trade as "Chlorination." The characteristics of the chlorinated or hardened shell rigidly governs the frictional drag of the wiper and its wiping action.

If the shell is on the hard side, it will have a low frictional drag on glass but it will not wipe the glass clean. On the other hand, if the shell is on the soft side, the wiper will give a clean wipe but the frictional drag will be high and may impose a heavy load on the driving means. The chlorinating or hardening process is very difficult to control to get uniform results. Despite the utmost care in the hardening treatment one batch of wipers may have relatively low friction on dry, or nearly dry glass while a second batch of wipers subjected to the same treatment may have such a high friction on dry and nearly dry glass as to make them unusable.

This variable coefficient of friction between a wiper blade and a windshield, and particularly the undesirable effects thereof, as alluded to hereinbefore, have been aggravated since it has become necessary to increase the wiping pressure on some windshields to prevent lifting of the wiping element due to wind conditions at high speeds.

One of the reasons why the problems of friction has become aggravated by increased wiper arm pressure in automobiles is due to the fact that greater areas of the wiper blade contact the windshield. Naturally, as the area of contact between the wiper blade and the windshield increases, the load imposed upon the wiper motor increases. In order to alleviate this condition, it has been proposed to mold a wiper blade with a plurality of longitudinally spaced knobs, or bumps, which limit the area of the windshield wiper that can contact the windshield. However, it has also been observed that such "knobbed" wiper blades, or squeegees, do not effectively clean a windshield due to the streaking caused by the knobs.

Other wiper blades have been provided with longitudinal ribs as for example those shown in the Zaiger Patent #2,051,668 and the Zierer Patent #2,254,343, the purpose being to present a multiplicity of wiping edges to the surface of the glass. It has been found that the addition of longitudinal ribs to the area of a wiper which contacts the glass increases the friction to a point usually more than if such ribs were not present and that the recesses between the ribs hold dust and dirt and that when wet the flow of water in the recesses carries the dust and dirt and spreads it along the blade causing objectionable smearing of the glass.

The present invention relates to means and a method of treating the surface of a wiper blade, or squeegee, to reduce the adhesion between rubber, or rubberlike compounds, and a glass surface, and thereby necessarily reduce the friction drag therebetween. Accordingly, among our objects are the provision of a squeegee having a surface with reduced adhesion to glass; the further provision of a method for treating the surface of rubber, or rubberlike materials, for reducing the adhesion of the material to glass; the still further provision of a wiper blade having a pitted surface; and the still further provision of a method for pitting, the surface of a rubber wiper blade to reduce its frictional resistance to movement across a glass surface. It should be explained that by the term "pitting" we mean breaking up the surface of the wiper or that portion which contacts the glass so that it is not smooth yet at the same time controlling the depth of the pits so that the wiper will not give a streaky wipe.

The aforementioned and other objects are accomplished on wipers or squeegees in the present invention by any grit blasting method such as vapor blasting, sand blasting or blasting with various grits or metal particles or, if so desired, the mold may be pitted so that the molded wiper or squeegee has a pitted surface as it comes from the mold. Any desired pattern of pitted surface may be readily produced in the mold by the well known photo pitting processes. Thus we can have a scattered pattern of pits produced in the wiper by blasting or a predetermined pattern of pits produced by molding.

When wiper blades, or squeegees, are treated in the above identified manner, it has been observed that the adhesion between rubber and glass is substantially reduced, and, consequently the friction drag therebetween is, likewise, reduced. Moreover, a wiper blade, or squeegee, having a pitted surface produced according to the method disclosed hereinbefore produces a very satisfactory wiping action, and due to the fine pitting, the water is distributed along the blade by a capillary action so that the blade, or squeegee, wets very readily yet there are not continuous recesses to spread dust and dirt.

Further objects and advantages of the present invention will be apparent from the following description, reference being had to the accompanying drawing wherein a preferred embodiment of the present invention is clearly shown.

In the drawing:

Fig. 1 is a fragmentary view, in elevation, depicting the vehicle equipped with a wiper blade treated according to the present invention.

Fig. 2 is a fragmentary sectional view taken along line 2—2 of Fig. 1.

Fig. 3 is an enlarged fragmentary sectional view of the first embodiment illustrating etched, or pitted, side surfaces.

Fig. 4 is a fragmentary view similar to Fig. 3 of a squeegee having pitted side surface and a pitted feather, or wiping edge.

Fig. 5 is a fragmentary view similar to Fig. 4 but having various shapes of pits which might be molded in the wiper.

With particular reference to Fig. 1, vehicle windshield cleaning mechanism is shown for a windshield 10, which mechanism includes an oscillatable shaft 12 to which one end of a wiper arm 14 is connected. The outer end of the wiper arm 14 is detachably connected to a wiper blade assembly 16 comprising a primary yoke 18, a pair of secondary yokes 20 and 22 movably connected to the ends of the primary yoke, opposite ends of each secondary yoke being movably connected at longitudinally spaced points to a flexible metallic backing strip 24. The flexible metallic backing strip 24, as is conventional, carries a freely flexible, elastomeric, rubber or rubberlike wiping element 26. Wiping pressure is applied from the arm 14 to the blade 16 by means of a coil spring 28, which interconnects inner and outer arm portions 30 and 32, respectively. The particular windshield wiper blade assembly disclosed herein is only exemplary, and is not to be construed as a limitation since the present invention is directed to the treatment of the surface of a squeegee, or wiping element, composed of rubber, or rubberlike, material so as to reduce its adhesion to glass.

As seen in Fig. 2, the squeegee element 26 may be of any conventional design in cross-sectional shape, and includes a feather edge, or wiping lip, 34, as well as side surfaces 36 and 38, which alternately contact the glass 10 during movements of the squeegee in opposite directions thereacross. As alluded to hereinbefore, the adhesion of rubber, or rubberlike compounds, which compose squeegees, to glass, varies considerably with the condition of the glass i.e., whether it is thoroughly wet, dry, or nearly dry. We have discovered that the frictional drag between a squeegee and a glass surface is highest when the glass surface is nearly dry, or "tacky."

We have also discovered that the adhesion of squeegees to glass under "tacky" conditions can be substantially reduced if all or portions of the squeegees are pitted. In the case of rubber windshield wiper blades which have been chlorinated and yet have such a high friction on glass that they are not usable we found that upon vapor blasting both sides of the blade thus producing a slightly matted surface the friction was practically reduced to one half of its former value. We also found that vapor blasting a previously unchlorinated rubber windshield wiper blade and then chlorinating the rubber produced a blade of still lower friction. In each case the blades wiped an automobile windshield of the wrap around type clean. Many of the tests were made using a strain gauge and a recording oscillograph to record the friction and it was found that pitted wiper blades gave a very smooth record free of the peaks encountered with blades not pitted.

Naturally, the depth and area of the pits must be controlled to prevent streaking of the surface being wiped. As an example, we have found that pits of a depth less than .001 produced by vapor blasting a squeegee with 350 mesh grit resulting in innumerable irregularly spaced minute depressions, are satisfactory.

We also found that a sheet of "Hypalon," a synthetic chlorinated rubberlike compound (Chlorosulfonated Polyethylene) made by E. I. du Pont de Nemours & Co. when molded to a finely pitted pattern on one face and smooth on the other face when moved over glass showed a high friction when the smooth face was engaging the glass and a greatly reduced friction when the molded pitted face was engaging the glass. We also vapor blasted the smooth face and found a great reduction in friction. This material was not subjected to any hardening treatment.

As will be seen in Fig. 5, patterns of various shapes may be molded in squeegees to bring about the desired reduction in friction on glass and yet retain the desired wiping characteristics. These molded pockets are of controlled size, shape and depth so as to result in good wiping action.

This invention therefore constitutes an improvement in squeegees in that it greatly reduces the effort required to clean a glass surface due to the reduction in friction occasioned by the pitting of the squeegee surface. It further greatly facilitates the hardening process required on squeegees made from rubber or rubber compounds in that a much wider latitude of control is obtained. It further makes possible the use of rubberlike compounds for squeegees without any hardening treatment.

While the embodiment of the present invention as herein disclosed, constitutes a preferred form, it is to be understood that other forms might be adopted.

What is claimed is as follows:

1. A squeegee of solid elastomeric material having a feather edge and a pair of wiping surfaces, said feather edge and wiping surfaces being pitted to a predetermined depth.

2. A squeegee of solid elastomeric material having a feather edge and a pair of wiping surfaces, said feather edge and wiping surfaces being pitted to a depth of less than .001 inch.

3. The method of manufacturing a squeegee of solid elastomeric material comprising molding the squeegee, grit blasting at least portions of the squeegee, and hardening the outer surface of squeegee.

4. The method of manufacturing a squeegee of solid elastomeric material comprising molding the squeegee, hardening the outer surface of squeegee, and grit blasting the wiping surfaces of the squeegee.

5. The method of reducing the adhesion between a solid elastomeric squeegee and glass comprising pitting at least a portion of the surface of the squeegee by abrasive blasting to a controlled pattern and depth.

6. A squeegee of solid elastomeric material having a pair of wiping surfaces on opposite sides thereof, said wiping surfaces having innumerable irregularly spaced minute depressions.

7. A squeegee of solid elastomeric material having a feather edge and a pair of wiping surfaces on opposite sides thereof, said wiping surfaces having innumerable irregularly spaced minute depressions.

8. A squeegee of solid elastomeric material having a feather edge and a pair of wiping surfaces on opposite sides thereof, said wiping surfaces having innumerable irregularly spaced minute depressions having a depth of less than .001 inch.

References Cited in the file of this patent

UNITED STATES PATENTS

| 1,825,376 | Vaughn | Sept. 29, 1931 |
| 1,978,633 | Horton | Oct. 30, 1934 |
| 2,132,268 | Mallard | Oct. 4, 1938 |
| 2,448,316 | Lesavoy | Aug. 31, 1948 |

FOREIGN PATENTS

| 498,549 | Great Britain | Jan. 1939 |
| 622,370 | Great Britain | May 2, 1949 |
| 854,122 | France | Jan. 1940 |